United States Patent
Adachi et al.

[11] Patent Number: 5,349,666
[45] Date of Patent: Sep. 20, 1994

[54] REDUCED POWER LINE FLUCTUATION/NOISE CIRCUIT BY INCREASING IMPEDANCE LEVEL WHEN NUMBER OF BUS LINES SIMULTANEOUSLY CHANGE STATE EXCEEDS THE PREDETERMINED NUMBER

[75] Inventors: Mitsuru Adachi; Tsunenori Umeki, both of Itami, Japan

[73] Assignee: Mitsubishi Denki Kabushiki Kaisha, Tokyo, Japan

[21] Appl. No.: 838,633

[22] Filed: Feb. 20, 1992

[30] Foreign Application Priority Data
Feb. 21, 1991 [JP] Japan ................... 3-048875

[51] Int. Cl.$^5$ ............... G06F 1/26; G08B 21/00; H03H 11/00; H03K 5/08
[52] U.S. Cl. .................. 395/750; 395/800; 323/208; 363/140; 340/657; 364/944.92; 364/221.8; 364/226.9; 364/265.5
[58] Field of Search .......... 395/750, 800; 323/208; 363/140; 340/657

[56] References Cited

U.S. PATENT DOCUMENTS

| | | | |
|---|---|---|---|
| 4,433,379 | 2/1984 | Schenk et al. | 395/325 |
| 4,523,143 | 6/1985 | Dvorak | 324/133 |
| 4,794,525 | 12/1988 | Pickert et al. | 395/750 |
| 4,860,198 | 8/1989 | Takenaka | 395/325 |
| 5,060,134 | 10/1991 | Hunninghaus | 395/250 |
| 5,088,023 | 2/1992 | Nakamura et al. | 395/425 |
| 5,095,485 | 3/1992 | Sato | 371/51.1 |
| 5,109,492 | 4/1992 | Noguchi et al. | 395/325 |

*Primary Examiner*—Parshotam S. Lall
*Assistant Examiner*—Krisna Lim
*Attorney, Agent, or Firm*—Townsend and Townsend Khourie and Crew

[57] ABSTRACT

A microcomputer that reduces through current of output buffers, and thus, reduces power line fluctuation that occurs when a large number of the bus lines connected to output buffers change state at the same time. The through current (or punch-through current) is reduced through the use of a detector circuit that detects the number of bus lines which are changing state and a decoder circuit that changes the impedance of output buffers, which drive the bus lines to external components, when the number of bus lines changing state at a given time exceeds a predetermined number.

7 Claims, 5 Drawing Sheets

REDUCED POWER LINE FLUCTUATION/NOISE CIRCUIT BY INCREASING IMPEDANCE LEVEL WHEN NUMBER OF BUS LINES SIMULTANEOUSLY CHANGE STATE EXCEEDS THE PREDETERMINED NUMBER

BACKGROUND OF THE INVENTION

1. Field of the Invention

The present invention relates to one-chip microcomputers which can be connected to an external memory.

2. Description of the Prior Art

When address and other data are sent from a one-chip microcomputer to an external memory, the one-chip microcomputer outputs bus data from an output terminal via an output buffer. FIG. 4 is a block diagram showing the buses and signal output unit of a conventional one-chip microcomputer. In the figure, plural address buses 1a–1c, the number of which is equal to the bit count of an address of the one-chip microcomputer, are connected to output terminals 5a–5c through output buffers 2a–2c; 40 is the CPU; 41 the working RAM; and 42 the external memory. CPU 40 is also connected with data line d, clock line CLK, and enable line EN.

FIG. 5 is a timing diagram showing the operation of an address signal output unit of the one-chip microcomputer shown in FIG. 4. In the figure, 14 is the internal clock output from CPU 40; 15 is the enable signal; 16 shows a signal from one of address buses 1a–1c output as an inverse of the previous bus state (i.e., H→L or L→H); 20 is an output signal from one of buffers 2a–2c to which address signal 16 is input; through current 21 flows to output buffers 2a–2c when signals from the output buffers are inversed-e.g., when output signal 20 from output buffer 2a changes from "H" to "L" or from "L" to "H." Further, when reading external memory 42, enable signal 15 returns data signal 22 on data line d while the L state is on, following a duration t2 after the detection of an address signal in output signal 20 from output buffer 2a–2c.

Due to the structure described above, an address bus signal output unit is a conventional one-chip microcomputer generates a large external load capacity when connected to external memory 42, and must thus be driven by an output buffer with large-sized transistors. When plural output buffers change state, plural address signal lines also change state at the same time within the short time period ta, causing a large amount of through current to flow to the output buffers. This through current becomes great as the number of address buses changing state at the same time increases, causing a flow of reverse current in the power line and therefore current fluctuations, which are a cause of malfunctions in one-chip microcomputers.

SUMMARY OF THE INVENTION

Accordingly, it is the object of the invention to provide a microcomputer that eliminates the problem described above, whereby current fluctuations and subsequent malfunctions do now occur when a large number of address buses change state at the same time.

According to the invention there is provided a one-chip microcomputer which determines the number of buses in which signal changes have occurred on the basis of the output from detector circuit 6 which detects signal changes in the various buses, then raises the impedance of variable-impedance buffers Ba–Bc when the number of buses exceeds a set number N.

When the detector signal from detector circuit 6 is input to decoder 10, and the total of buses 1a–1c experiencing state changes exceed a specified number, decoder 10 raises the impedance of the variable-impedance buffer units as described above, causing a delay in the signals from output units Ba–Bc in respect to signals in buses 1a–1c.

The above and other objects, features, and advantages of the Invention will become more apparent from the following description when taken in conjunction with the accompanying drawings.

DESCRIPTION OF THE PREFERRED EMBODIMENT

Figure 1:
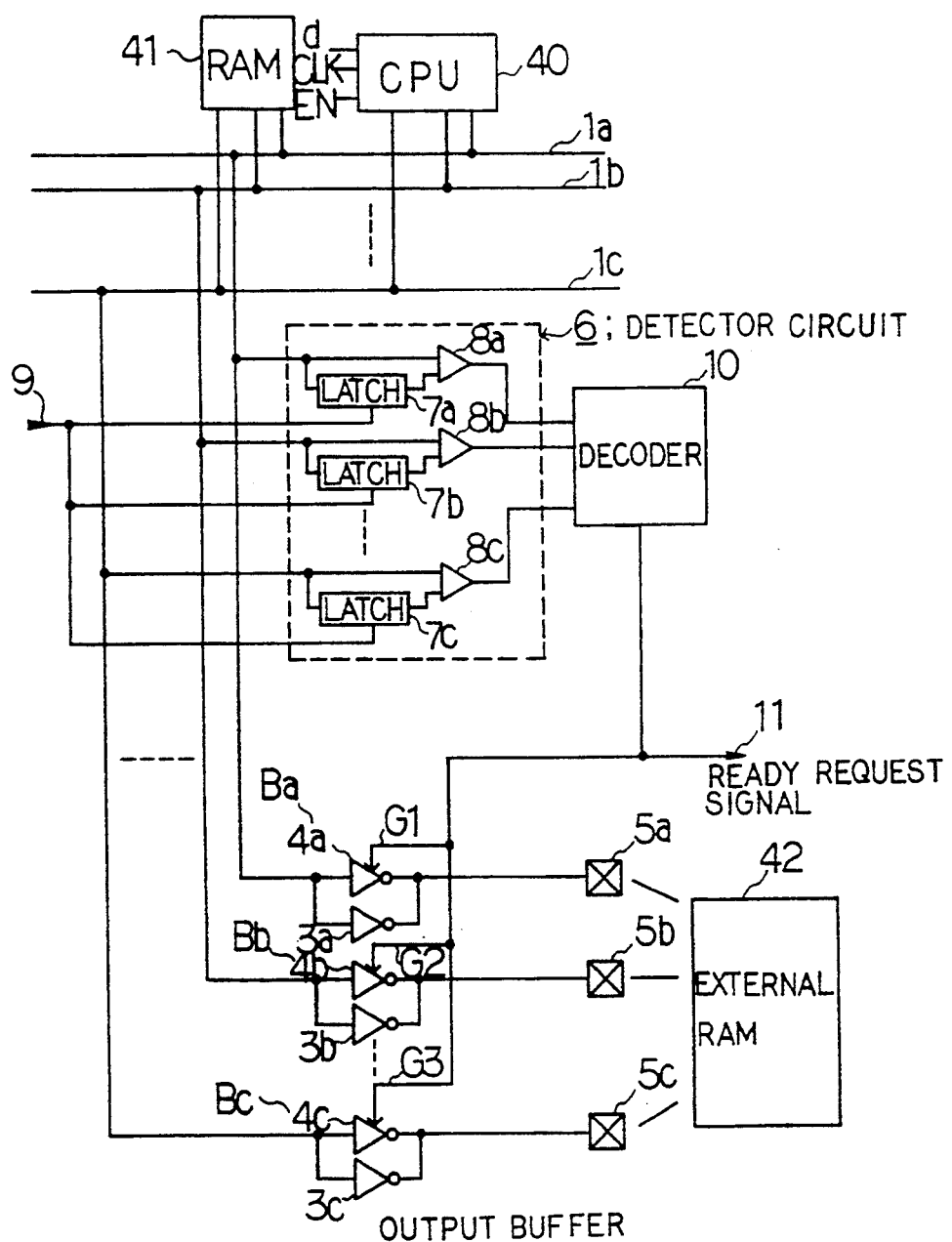
FIG. 1 is a block diagram showing the structure of a microcomputer according to an embodiment of the invention.

FIG. 1 is a block diagram of the address buses and signal output unit of an embodiment according to the invention. In the figure, 1a–1c are address buses whose total number is equal to the bit count of an address of the microcomputer. Address buses 1a–1c are connected to output buffers 3a–3c through to output terminals 5a–5c. Output buffers 3a–3c are connected in parallel to other output buffers 4a–4c. The combined impedance of parallel output buffers 3a–3c and 4a–4c is equal to the impedance of a single conventional output buffer (2a–2c in FIG. 3). If the impedance of output buffers 3a, 4a,, etc. is Z, then the combined impedance of parallel output buffers 3a, 4a, etc. is $$1/Zm = 1/Z + 1/Z, \quad Zm = Z/2.$$

The impedance is thus halved when the output buffers are linked in parallel. Parallel output buffers 3a–3c and 4a–4c are comprised of variable-impedance buffer units Ba–Bc. In addition, 40 is a central processing unit or CPU, 41 the internal RAM, and 42 the external RAM. CPU 40 is connected with data line d, clock line CLK, and enable line E.

Address buses 1a–1c are also connected to bus inversion detector circuit 6 which detects inversions in address signals. Output signals from address buses 1a–1c that are input to bus inversion detector circuit 6 are divided into two branches, one directly connected to the input terminals of comparators 8a–8c, and one to the other input terminals of comparator 8a–8c through latches 7a–7c. Latches 7a–7c operate in synchronization with internal clock 9 which is input to each latch. When the output signal from 1a and other address buses invert, latches 7a–7c output an inverse signal following time duration t (described below). The outputs from bus inversion detector circuit 6 (i.e., output signals from 8a–8c) are connected to decoder 10. Decoder 10 outputs "L" when the number of "L"s among the input signals exceed the specified limit N, and "H" when the number is below the limit N. In other words, decoder 10 outputs "H" when the number of address buses among 1a–1c changing state at the same time is fewer than N, and "L" when the number of address buses changing state at the same time exceed N as a warning to the outside to take malfunction measures. Moreover, the limit N is the maximum number of address buses among 1a–1c that can change state at the same time and not cause malfunctions, the number being circuit-determined according to the hardware. The output signal of decoder 10 branches into two: one for use as ready request signal 11 and the other for the control of gates G1–G3 of output buffers 4a–4c. When the output signal of decoder 10 is "L," the ready request signal turns on and output buffers 4a–4c turn off. In order to extend the access time of the CPU with external memory 42, ready signal 11 is connected to the ready input of CPU 40.

Figure 2:
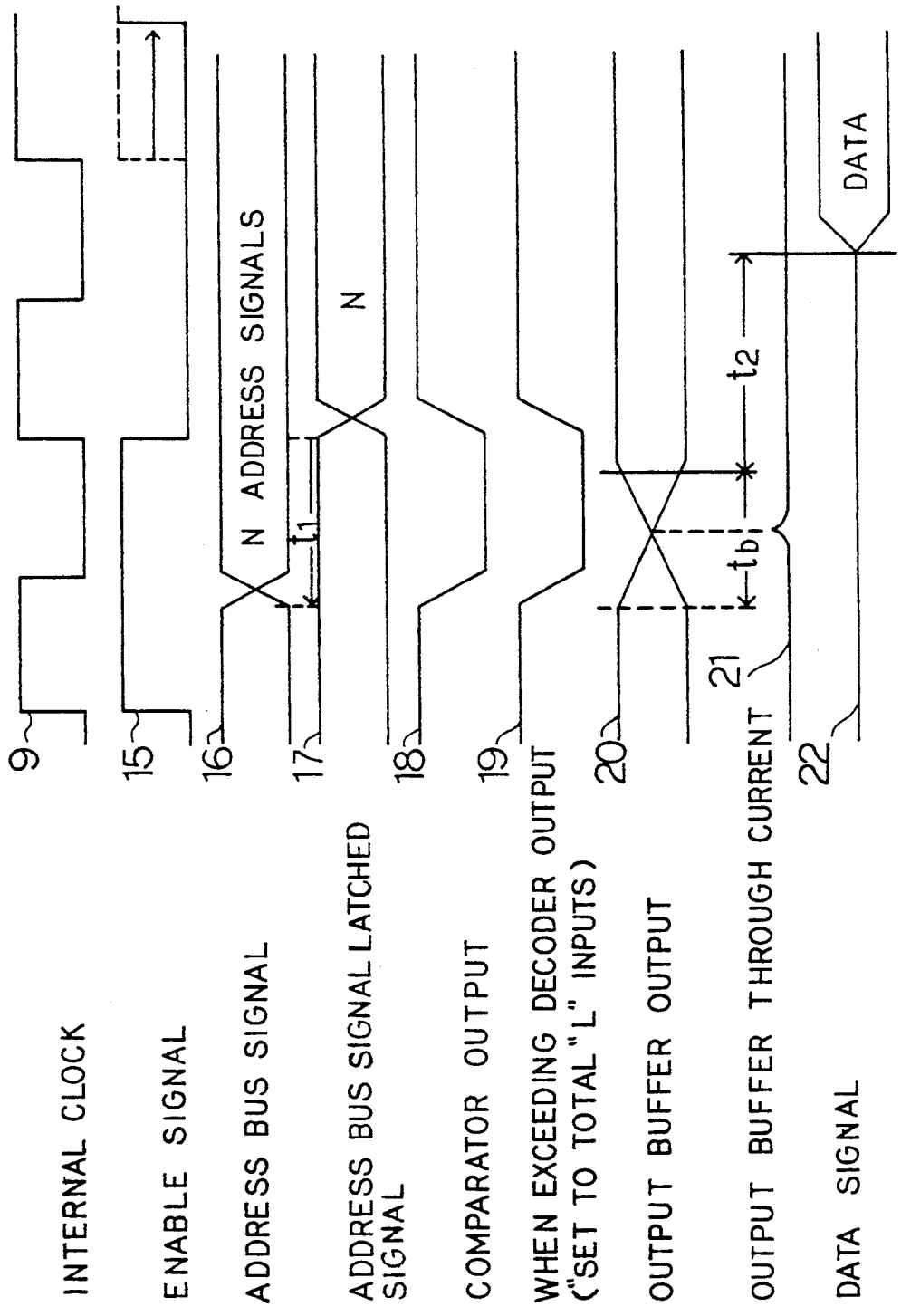
FIG. 2 is a timing chart showing the operation of the microcomputer of FIG. 1.

FIG. 2 is a timing diagram showing the operation of the address bus signal output unit. In the FIG. 9 is an internal clock of clock line CLK of a one-chip microcomputer; 15 is an enable signal; 16 is a signal of one of plural address buses 1a–1c output as an inverse of the previous bus state (i.e., H→L or L→H). Each of comparators 8a–8c compares signal 16 from address buses 1a–1c with latched signal 17, which is address bus signal 16 whose inversion has been delayed by latches 7a–7c. Output 18 of comparators 8a–8c outputs "L" during time duration t1, following the inversion of data of address buses 1a–1c. When the data of address bus 1a invert, an inverted signal immediately enters one input of, for example comparator 8, while the other signal enters the other input of the comparator, to invert only after the specified time duration t1 due to the action of latch 7. For this reason, during an interval of t1, the two inputs, 16 and 17, do not match, and comparator 8 therefore outputs "L" or 18.

If N number of address buses 1a–1c output inverted signals, a delay is generated by latches 7a–7c, and "L" is output by N number of comparators 8a–8c. When the number of address buses among 1a–1c experiencing state changes exceeds the limit N, decoder 10 outputs "L" in output 19 during the time duration t1. "L" is then input to the gates of output buffers 4a–4c, and output 19 from decoder 10 turns off during the "L" output duration tb, leaving on only output buffers 3a–3c. Through current 21 at this time is inversely proportional to the impedance, and therefore decreases. This results in a drop in the driving power of output buffers 3a–3c, and a delay in the inversion of data of output 20 from output buffers 3a–3c during time interval tb. As a result, the total through current from output buffers 3a–3c decreases, power line fluctuations are reduced, and malfunctions in the one-chip microcomputer are prevented. Since the time for the inversion of the output signal from output buffers 3a–3c is delayed, the time for confirming the address in external memory 42 is extended and signal 22, which returns from external memory 42 on data bus d, is delayed; however, since the ready request signal is in "L" state, the CPU undergoes one wait, and the broken line in enable signal 15 is moved an interval of 1 minute to the solid line; in other words, the "L" duration of enable signal 15 is lengthened, and data are read in without a reduction in reading time.

Figure 3:
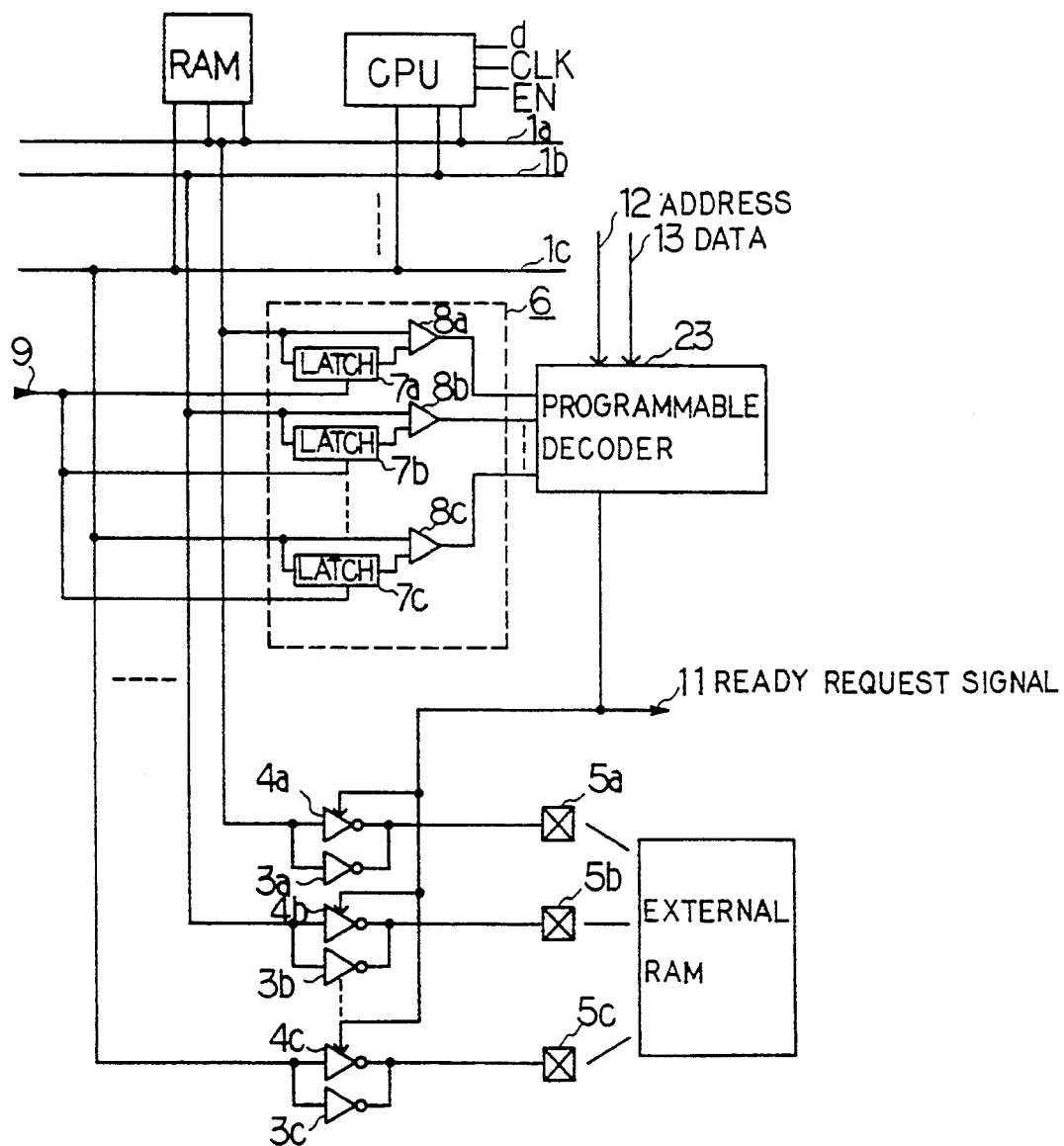
FIG. 3 is a diagram of another embodiment of the invention.
Figure 4:
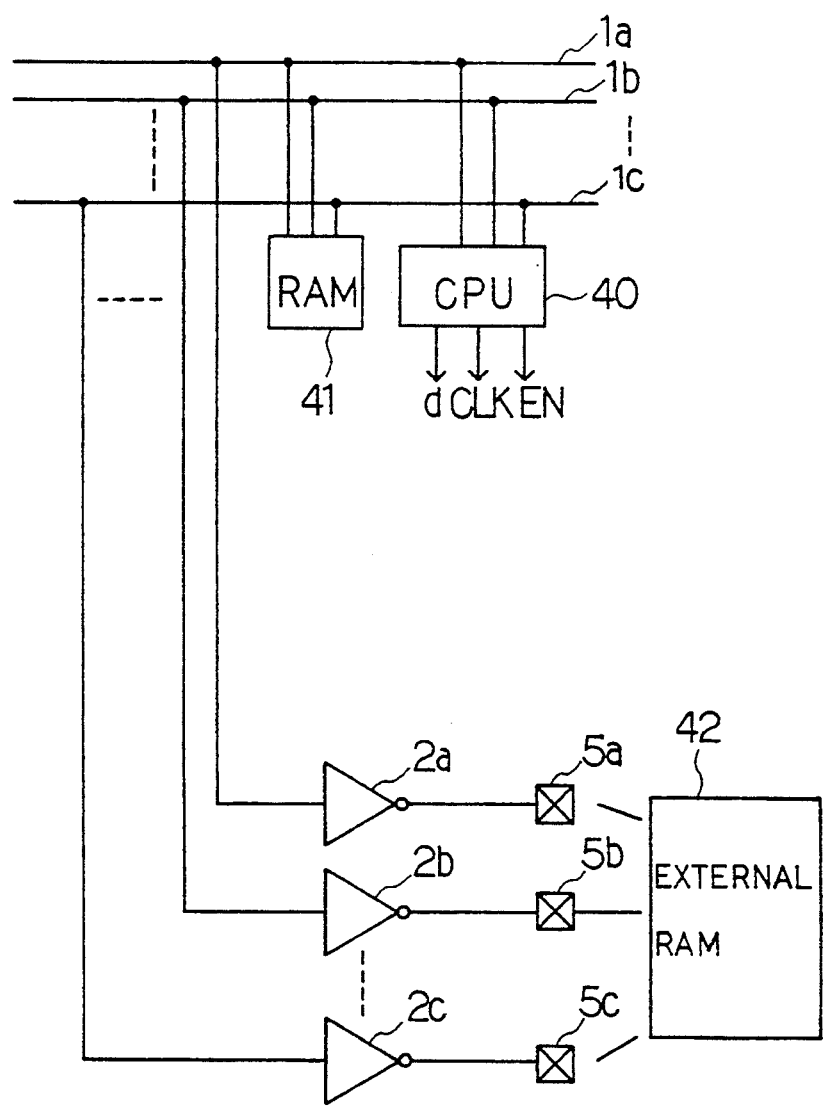
FIG. 4 is block diagram showing the structure of a conventional microcomputer.
Figure 5:
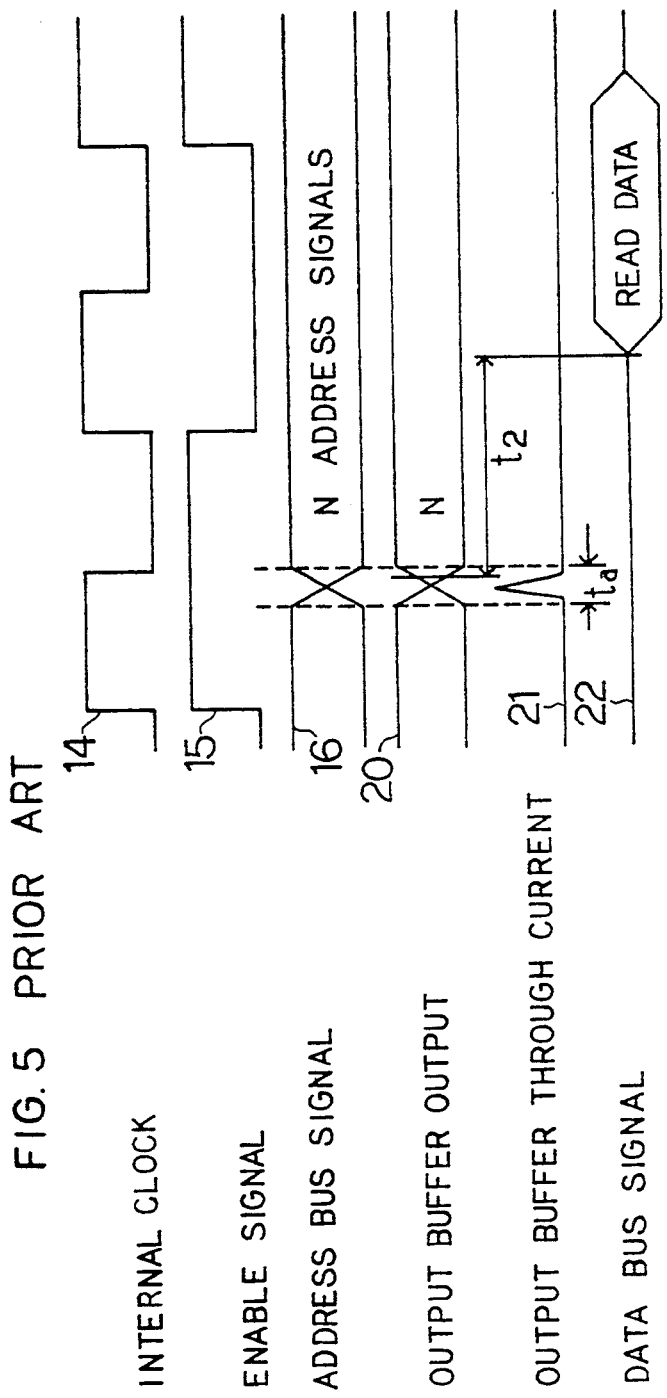
FIG. 5 is a timing chart showing the operation of a conventional microcomputer.

FIG. 3 shows another embodiment of the invention. Except for the programmable decoder 23 in place of decoder 10, the structure and operation of this embodiment are the same as those of the first embodiment.

When the input of address 12 and data 13 to programmable decoder 23 is enabled, then programmable decoder 23 outputs "L" when the number of "L" input within control input signal 18 exceeds limit N. Limit N can be freely set to N1, N2, or NN by address 12 and data 13. For this reason, the incorporation of this one-chip microcomputer provides the convenience of setting the limit N high for devices with an abundant power capacity, or low for devices with a limited power capacity.

In both embodiments, when inversions do not exceed limit N, buffers 3a, 4a, etc. are parallel circuits that transfer address inversion signal 1b to output terminals 5a–5c without delay.

As has been explained above, the microcomputer according to the invention has plural buffers comprised of variable-impedance buffer units, a detector circuit that detects signal changes in each bus, and a decoder which raises the impedance of each buffer unit when the number of buses in which signal changes have occurred, based on the output from the detector circuit, exceeds a specified value. As a result, when a larger number of address bus signals change state at the same time, the impedance of the buffer units rise, turning on the ready signal by which the access time to the external memory is extended and signal changes on the output side of the buffer units are delayed. The result is the prevention of fluctuations in the power line, by which a microcomputer free of malfunctions is made possible.

What is claimed is:

1. A circuit in a microcomputer for reducing noise on a power line created when selected ones of a plurality of bus lines connected to an external load simultaneously change state, said circuit comprising:
   a plurality of variable-impedance buffer units, coupled to the plurality of bus lines, for driving signals between the plurality of bus lines and the external load, said plurality of variable impedance buffer units having a specific impedance level;
   a detector circuit, coupled to the plurality of bus lines, for detecting signal inversions in each one of the plurality of bus lines; and
   a decoder, coupled to said detector circuit and to said plurality of variable-impedance buffer units, for increasing said impedance level of said plurality of variable-impedance buffer units when the number of bus lines in which said detector circuit detects signal inversions exceeds a predetermined number, thereby decreasing through current of said buffer units and reducing noise on the power line.

2. The circuit set forth in claim 1 wherein said decoder allows said predetermined number to be changed.

3. The circuit set forth in claim 1 wherein each of said plurality of variable-impedance buffers comprise first and second buffers coupled in parallel, wherein said first buffer is disabled and disconnected from said second buffer by the output of the said decoder.

4. A single-chip microcomputer that stores data in an external memory and generates address signals to access the external memory, said microcomputer comprising:
   a central processing unit for generating said address signals;
   a plurality of address bus lines coupled to said central processing unit for transmitting said address signals;
   an output buffer circuit, coupled to said plurality of address bus lines, for driving said address signals to the external memory, said output buffer circuit introducing an impedance level on said plurality of address bus lines;

a detector circuit, coupled to said plurality of address bus lines, for detecting how many of said address bus lines change state at a predetermined time;

impedance varying means, coupled to said detector circuit and to said output buffer circuit, for increasing said impedance introduced by said output buffer circuit when the number of address bus lines that change state at said predetermined time is greater than a predetermined number so that through current of said output buffer circuit is reduced and power line fluctuation associated with said through current is reduced.

5. The microcomputer of claim 4 wherein said predetermined number can be varied by said impedance varying means.

6. The microcomputer of claim 5 wherein said output buffer circuit comprises a first and second buffer gate coupled in parallel for each address bus line and wherein said impedance varying means increases the impedance of said output buffer circuit by disabling each first buffer gate.

7. The microcomputer of claim 6 wherein each one of said first buffer gates comprises a tri-state gate.

* * * * *